United States Patent [19]

Mayer

[11] 4,454,654
[45] Jun. 19, 1984

[54] NAVIGATIONAL ANGLE-MEASUREMENT DEVICE

[76] Inventor: Hans G. Mayer, Telemannstr. 5, 2000 Hamburg 19, Fed. Rep. of Germany

[21] Appl. No.: 440,437

[22] Filed: Nov. 9, 1982

[30] Foreign Application Priority Data

Nov. 11, 1981 [DE] Fed. Rep. of Germany .... 8132933[U]

[51] Int. Cl.³ ........................... G01C 1/00; G01B 3/56
[52] U.S. Cl. ...................................... 33/1 N; 33/403; 33/485
[58] Field of Search .............. 33/1 N, 1 SD, 403, 421, 33/424, 426, 453, 471, 485

[56] References Cited

U.S. PATENT DOCUMENTS

| | | | |
|---|---|---|---|
| 1,349,455 | 8/1920 | Zeiner-Henriksen | 33/403 |
| 2,004,951 | 6/1935 | Jensen | 33/1 N |
| 2,190,071 | 2/1940 | Keppers | 33/403 |
| 2,602,228 | 7/1952 | Webber | 33/1 N |

FOREIGN PATENT DOCUMENTS

| | | | |
|---|---|---|---|
| 1176122 | 4/1959 | France | 33/1 N |
| 82095 | 11/1934 | Sweden | 33/1 N |

OTHER PUBLICATIONS

Miller et al., "Tangent Protractor", RCA Pub. No. 559,280, Feb. 1950.

Primary Examiner—Richard R. Stearns
Attorney, Agent, or Firm—Browdy and Neimark

[57] ABSTRACT

A two-part navigational measurement device comprising a transparent circular disc having a coordinate grid thereon. An annular ring is coaxially positioned about the circular disc, the circular disc being rotatable within the annular ring. The annular ring has gradations around at least half of its circumference. A tangent ruler is fixed to the annular ring, the tangent ruler having a tangent edge which is tangent to the annular ring at the mid-point of the gradations. Means, such as a set screw may be provided for locking the disc and the annular ring against rotation relative to each other after the course to be adhered to has been determined.

7 Claims, 3 Drawing Figures

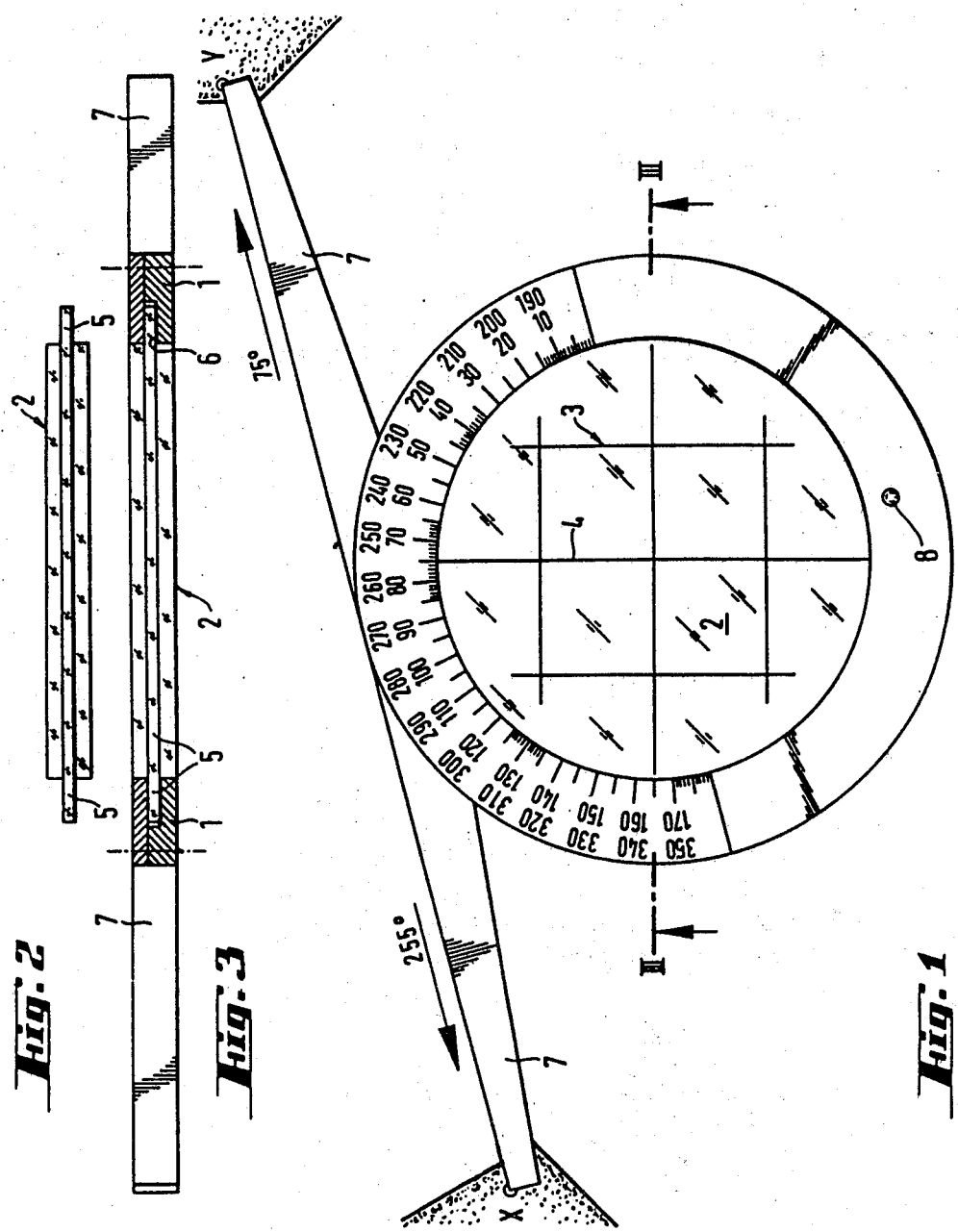

NAVIGATIONAL ANGLE-MEASUREMENT DEVICE

FIELD OF THE INVENTION

The invention relates to an angle-measurement device intended primarily for navigational purposes, but which is also suitable for hiking when following a map, and so forth.

BACKGROUND OF THE INVENTION

Determining a course on a map or chart has heretofore been accomplished by means of measurement triangles that had to be displaced relative to one another. It was frequently not easy to use this method on the open sea, however, because the movements of the ship made it difficult to displace the triangles accurately.

SUMMARY OF THE INVENTION

In contrast to the prior art, the navigational angle-measurement device according to the invention is a two-part device in which a transparent disc provided with a coordinate grid is rotatably disposed in a circular ring; this ring has gradations marked on at least half its circumference, and a tangent ruler is attached firmly to it. The edge of the tangent touches the circular ring in the center of the gradations. The device preferably also has a locking screw to prevent the relative rotation of the two parts of the angle-measurement device after the course to be taken has been determined.

BRIEF DESCRIPTION OF THE DRAWINGS

The drawings illustrate one form of embodiment of the invention.

FIG. 1 shows the device in use, seen in plan view;
FIG. 2 shows the coordinate disc in a side view;
FIG. 3 shows the mounting of the disc in the ring equipped with the gradations, seen from the side in section.

DESCRIPTION OF THE PREFERRED EMBODIMENT

The transparent disc 2, which is provided with a coordinate grid 3, is rotatably seated in the ring 1, which may be of plastic, metal, wood or the like. The disc 2 may be of glass, or even better of plexiglass or some other transparent plastic. The center line 4 of the coordinate grid 3 is extended through the entire disc 2, while the rest of the coordinate grid lines preferably terminate shortly before the edge of the disc. The edge of the disc has a narrow protrusion 5, which extends around the disc and engages an annular groove 6 in the interior of the ring 1 having the gradations, so that the coordinate disc 2 is rotatable in an arbitrary manner relative to the ring 1. A semicircle of the ring 1 bears the gradations from 0° to 180°, and markings indicating 180° to 360° read in the opposite direction.

A tangent ruler 7 is furthermore secured to the ring 1 bearing the gradations. The arrangement is such that the outer edge of the ruler forms the tangent to the circle. The center of the gradations, that is, the marking for 90° and 270°, is located at the point of contact with this tangent.

In order to determine a course, the ruler is placed on the map or chart such that it connects the points marking the beginning and the end of the trip. The coordinate disc 2 is now rotated until the center line 4 coincides with a degree of longitude; efficaciously, a degree of longitude located in the vicinity of the line for the end of the trip is used. However, should it be more convenient in a particular case, the device can also be placed with the extended center line over a degree of latitude; in that case, a gradation offset by 90° should be used.

The extended center coordinate 4 of the coordinate disc 2 now indicates the precise angular course to be steered. If the ruler 7 is not long enough to connect the points for the beginning and end of the trip, the angle-measurement device can quite simply be shifted by one degree of latitude or longitude.

In determining the course, a possible magnetic declination of the chart can be taken into account by subtracting the particular angular value from, or adding it to, the measured course value, thus easily arriving at a true course.

To prevent the course value, once determined, from shifting as a result of the movement of the ship and the like, the two parts of the device can be fixed immovably relative to one another by means of a set screw 8. By reading off the gradations on the ring, both the course and the opposite course can easily be determined. For instance, in the example shown in FIG. 1, the course for a trip from X to Y may be 75°; the course from Y to X would then be 255°.

It is to be understood that the foregoing description of a preferred embodiment is given entirely by way of an illustrative example, and that variants of the invention may be described without departing from the scope of the invention which is defined in the appended claims.

What is claimed is:

1. A two-part navigational angle measurement device comprising a transparent circular disc having a coordinate grid thereon, an annular ring coaxially positioned about said circular disc, said circular disc being rotable within said annular ring, said annular ring having gradations around at least half of its circumference, a tangent ruler fixed to said annular ring, said tangent ruler having a tangent edge which is tangent to said annular ring at the mid-point of said gradations.

2. A two-part navigational angle measurement device as defined in claim 1 in which said annular ring has an annular groove extending radially outwardly from the inner periphery of said annular ring, and said disc has a radially outwardly extending protrusion which is received in said annular groove of said annular ring to guide said disc when it rotates relative to said annular ring.

3. A two-part navigational angle measurement device as defined in claim 2 in which said protrusion extends annularly around the periphery of said disc for engagement with said annular groove of said annular ring.

4. A two-part navigational angle measurement device as defined in claim 1 in which the outer edge of said tangent ruler is tangent to said annular ring.

5. A two-part navigational angle measurement device as defined in claim 1 including means for locking said disc and said annular ring against rotation relative to each other after the course to be adhered to has been determined.

6. A two-part navigational angle measurement device as defined in claim 5 in which said means for locking said disc and said annular ring against rotation relative to each other is a set screw.

7. A two-part navigational angle measurement device as defined in claim 1 in which said gradations on said annular ring represent degrees.

* * * * *